United States Patent [19]

Hanji et al.

[11] Patent Number: 4,497,906
[45] Date of Patent: Feb. 5, 1985

[54] SOLID CATALYST COMPONENT FOR OLEFIN POLYMERIZATION

[75] Inventors: Katsumi Hanji, Funabashi; Kiyoshi Kawai, Toyonaka, both of Japan

[73] Assignee: Sumitomo Chemical Company, Limited, Osaka, Japan

[21] Appl. No.: 465,674

[22] Filed: Feb. 10, 1983

[30] Foreign Application Priority Data

Feb. 16, 1982 [JP] Japan .................................. 57-24076
Feb. 16, 1982 [JP] Japan .................................. 57-24077

[51] Int. Cl.³ .......................... C08F 4/62; C08F 4/64; C08F 4/68
[52] U.S. Cl. .................................. 502/110; 502/115; 502/116; 502/117; 502/113; 526/127; 526/128
[58] Field of Search ............... 502/110, 115, 116, 113, 502/117

[56] References Cited

U.S. PATENT DOCUMENTS

| | | | |
|---|---|---|---|
| 3,135,809 | 6/1964 | Bosmajian | 502/103 X |
| 3,907,759 | 9/1975 | Okada et al. | 502/116 X |
| 4,109,071 | 8/1978 | Berger et al. | 502/113 |
| 4,159,963 | 7/1979 | Sakurai et al. | 502/116 |
| 4,192,772 | 3/1980 | Berger et al. | 502/113 X |
| 4,235,984 | 11/1980 | Shiga et al. | 502/116 X |
| 4,252,670 | 2/1981 | Caunt et al. | 502/110 |
| 4,296,223 | 10/1981 | Berger | 502/134 X |
| 4,310,648 | 1/1982 | Shipley et al. | 502/113 X |
| 4,395,360 | 7/1983 | Albizatti et al. | 502/116 X |

FOREIGN PATENT DOCUMENTS

151704 1/1981 Japan .

Primary Examiner—Patrick Garvin
Attorney, Agent, or Firm—Stevens, Davis, Miller & Mosher

[57] ABSTRACT

A solid catalyst component for olefin polymerization comprising a hydrocarbon-insoluble product (III) obtained by reacting (A) a silicon compound selected from the group consisting of
  (1) halogen-containing silicon compounds,
  (2) silicon compounds having a monomeric unit

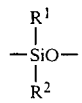

(wherein $R^1$ and $R^2$ may be the same or different, $R^1$ represents an alkyl, aryl, cycloalkyl, alkoxy, or aryloxy group, or a hydrogen atom, and $R^2$ represents an alkyl, aryl, or cycloalkyl group or a hydrogen or halogen atom) and a polymerization degree of 2 to 10,000,
  (3) silanols of the general formula $R_l^3 Si(OH)_{4-l}$ (wherein $R^3$ represents an alkyl, aryl, or cycloalkyl group or a hydrogen atom, and $l$ is 1, 2 or 3) or condensation products thereof,
  (4) silicon compounds represented by the general formula $R_m^4 Si(OR^5)_{4-m}$ (wherein $R^4$ represents n alkyl, aryl, cycloalkyl, or alkenyl group or a hydrogen atom, $R^5$ represents an alkyl or aryl group or a fatty acid moiety, and m is 1, 2 or 3), and
  (5) silicon compounds or polymers thereof represented by the general formula $[SiO_a(OR^6)_b]_n$ (wherein $R^6$ represents an alkyl, cycloalkyl, aralkyl or aryl group or a fatty acid moiety, and a and b are each a number defined by the formula $0 \leq a \leq 1$ or $2 \leq b \leq 4$, and n is an integer of from 1 to 10,000), with (B) a compound of a transition metal of Groups IVa, Va and VIa of the periodic table to form a reaction mixture (I), further reacting the reaction mixture (I) with (C) an organomagnesium compound selected from organomagnesium compounds or hydrocarbon-soluble complexes thereof with an organometallic compound capable of solubilizing said organomagnesium compounds, to produce an intermediate product (II) and contacting the intermediate product (II) with (D) an organoaluminum halide represented by the general formula $R_0^7 AlX_{3-c}$ (wherein $R^7$ represents an organic group having 1 to 20 carbon atoms, X represents a halogen, and c is a number defined by the formula $0 < c < 3$)

to form the hydrocarbon-insoluble product (III).

24 Claims, No Drawings

SOLID CATALYST COMPONENT FOR OLEFIN POLYMERIZATION

This invention relates to a novel high-activity solid catalyst component for Ziegler catalyst system for use in olefin polymerization and, from a different viewpoint, to a process for the preparation of said solid catalyst component.

When an olefin is polymerized by using the solid catalyst component of this invention as the transition metal catalyst component of the Ziegler catalyst system, the polymer yields per unit quantity of the transition metal as well as per unit quantity of the solid catalyst component is so much increased that it becomes unnecessary to remove the catalyst residue from the polymerizate after completion of the polymerization. Moreover, the polymer build-up on the wall of polymerization vessel during polymerization is very little and there is formed in slurry or gas-phase polymerization a powdered polymer in the form of approximated sphere or elongated sphere (ellipsoid), which has a narrow particle size distribution, a high bulk density, and a desirable flowability. Further, according to this invention, it is possible to control the molecular weight of a polymer within the range of from narrow to broad by suitably selecting the material ratio of components used in preparing the catalyst and the type of compounds of transition metals of Groups IVa, Va and VIa of the periodic table.

It is needless to say that in the production of olefin polymers, a highly active catalyst has a high utility value from the industrial viewpoint, because it eliminates the otherwise necessary step of removing the catalyst residue from the polymer after completion of the polymerization. However, it is to be noted that the catalyst activity should be evaluated on the weight basis of transition metal as well as solid catalyst. Most of the catalysts comprising a transition metal compound such as titanium tetrachloride supported on a carrier such as a magnesium compound, which have recently been actively developed, are unsatisfactory with respect to the polymerization activity per unit quantity of the solid catalyst. On the other hand, the polymer build-up on the wall of polymerization vessel should be as little as possible, because it causes various operation troubles which lead to a decrease in operation efficiency. In the case of slurry polymerization or gas-phase polymerization, it is desirable in view of the steadiness and efficiency of the operation that the polymer powder has a high bulk density, narrow particle size distribution, and good flowability (a property of the particles to flow). In view of the above requirements, in the production of olefin polymers, a polymerization catalyst of industrial superiority is such that it has a sufficiently high activity on the weight basis of transition metal and solid catalyst to omit the step of removing the catalyst residue, it causes little build-up of polymer on the wall of polymerization vessel, and it gives in slurry or gas-phase polymerization a polymer powder having a high bulk density and a high flowability. On the other hand, the molecular weight distribution of the resulting polymer is an important factor which controls the processability of the polymer as well as the appearance and physical properties of the fabricated articles. For instance, a polymer of narrow molecular weight distribution is suitable for injection molding or rotational molding, while that of broad molecular weight distribution is desirable for blow molding, extrusion molding, or film extrusion. Therefore, if it is possible to regulate easily the molecular weight distribution of a polymer by simple means, a great industrial advantage will be gained, because it then becomes possible to produce a wide variety of polymers suitable for particular uses.

It has been well known that a catalyst system (so-called Ziezler catalyst) comprising a combination of a compound of transition metals of Groups IVa to VIa of the periodic table and an organometallic compound of metals of Groups I to III is effective as the catalyst for olefin polymerization. These catalysts, however, do not always meet the above requirements and so cannot be called catalysts of industrial superiority, because of their low activity in general and, as a consequence, the necessity of removing the catalyst residue from the polymerizate after completion of the polymerization.

Concerning the Ziegler catalyst, various improvements have heretofore been published. For instance, catalytic systems comprising combinations of an organoaluminum compound and a reduction product of a transition metal compound in normal maximum valence state with an organomagnesium compound have been disclosed [Japanese patent application "Kokai" (Laid-open) Nos. 4,392/71, 4,393/71 and 11,695/72]. Other disclosed methods and catalyst systems include a polymerization method in which at least a major portion of a tetravalent titanium compound is reduced with the reaction mixture of an organoaluminum halide and an organomagnesium compound and the resulting reduction product is activated with an organoaluminum compound before and/or after feeding to the polymerization zone (Japanese patent publication No. 11,672/76); a gas-phase polymerization method employing a catalyst prepared by reducing a transition metal compound in maximum valence state with a reducing mixture of an aluminum halide compound and an organomagnesium compound and mixing the resulting product with an organoaluminum compound as activator (Japanese patent publication No. 39,468/75); a catalyst system comprising an organometallic compound and a catalyst component prepared by treating a solid reaction product of a transition metal compound and an organomagnesium compound with a Lewis acid [Japanese patent application "Kokai" (Laid-open) No. 126,785/76]; a polymerization method, in which there is used a catalyst comprising the reaction product of (1) a tetra-or tri-valent titanium ester, (2) an organomagnesium compound, and (3) an organometal halide of a metal of Group IIIa of the periodic table [Japanese patent application "Kokai" (Laid-open) No. 143,883/75]; a catalyst system comprising an organoaluminum compound and a product of the reaction between a Grignard reagent and a reaction mixture of a silicon halide and a transition metal halide (Japanese patent publication No. 1,321/81); a catalyst system comprising an organometallic compound and a reaction product obtained by heating (1) a hydroxylated organic compound, (2) metallic magnesium, (3) an oxygen-containing organic compound of a metal of Groups IVa, Va and VIa of the periodic table, (4) a halogen-containing compound of a metal of Groups IVa, Va and VIa of the periodic table, and (5) an aluminum halide compound (Japanese patent publication No. 39,714/77); a catalyst system comprising an organoaluminum compound and a solid reaction product of (1) a dihalide of magnesium, calcium, manganese, or zinc, (2) an oxygen-containing organic compound of titanium, zirconium or vanadium, and (3) an organoaluminum halide (Japanese patent publication No. 37,195/76); a catalyst system comprising an organoaluminum compound and a solid catalyst component obtained by the reaction of a mixture in a specified ratio of (1) an oxygen- or halogen-containing organic compound of magnesium, (2) an oxygen- or halogen-containing organic compound of titanium, (3) an oxygen-or halogen-containing organic compound of zirconium, and (4) an organoaluminum halide (Japanese patent publication No. 8,083/80); a catalyst system comprising an organometallic compound and a solid catalyst component obtained by reacting a halogen- or alkoxy-containing organoaluminum compound with a solid product derived from the reaction of a halogen-containing compound of titanium or vanadium with a reaction product of a hydropolysiloxane, a silicon compound containing an organic group and hydroxyl group bonded to the silicon atom, and a Grignard reagent (Japanese patent publication No. 7,443/80); and a catalyst system comprising an organometallic compound and a solid product obtained by the reaction of (1) at least one member selected from metallic magnesium and hydroxylated organic compounds, oxygen-containing organic compounds of magnesium, and halogen-containing magnesium compounds, (2) an oxygen-containing organic compound of titanium or a halogen-containing titanium compound, (3) an oxygen-containing organic compound of zirconium or a halogen-containing zirconium compound, (4) a silicon compound, and (5) an aluminum halide compound [Japanese patent application "Kokai" (Laid-open) No. 151,704/81]. These improved catalyst systems, however, are yet unsatisfactory from the industrial viewpoint with respect to polymerization activity and powder characteristics of the polymer. Moreover, a polymer of broad molecular weight distribution is not obtainable by use of these catalyst systems, except for those disclosed by Japanese patent publication Nos. 39,714/77 and 8,083/80 and Japanese patent application "Kokai" (Laid-open) No. 151,704/81.

The present inventors carried out an extensive study to develop a catalyst for olefin polymerization, which is highly active and industrially advantageous and, as a result, found that a solid catalyst component having a high activity and capable of producing a desirable polymer is obtained by reacting an organomagnesium compound with a reaction mixture derived from a silicon compound and a compound of a transition metal of Groups IVa, Va and VIa of the periodic table, and further contacting the resulting product with an organoaluminum halide compound represented by the general formula $R_c^7AlK_{3-c}$ (wherein $R^7$ represents an organic group of 1 to 20 carbon atoms, X represents a halogen atom, and c is a number defined by the formula $0<c<3$) to obtain a hydrocarbon-insoluble product. When the resulting hydrocarbon-insoluble product is used as the solid catalyst component, the polymer build-up on the wall of polymerization vessel is little, and when it is used in slurry or gas-phase polymerization, there is formed a polymer powder in the form of approximated sphere or elongated sphere (ellipsoid) having a narrow particle size distribution, a high bulk density, and a high flowability; moreover, the molecular weight of the polymer can be easily regulated. The present invention has been accomplished on the basis of said finding.

An object of this invention is to provide a novel solid catalyst component for olefin polymerization.

Other objects and advantages of this invention will become apparent from the following description.

According to this invention, there is provided a solid catalyst component for olefin polymerization comprising a hydrocarbon-insoluble product (III) obtained by reacting (A) a silicon compound selected from the group consisting of
(1) halogen-containing silicon compounds,
(2) silicon compounds having a monomeric unit

(wherein $R^1$ and $R^2$ may be the same or different, $R^1$ represents an alkyl, aryl, cycloalkyl, alkoxy, or aryloxy group, or a hydrogen atom, and $R^2$ represents an alkyl, aryl, or cycloalkyl group or a hydrogen or halogen atom) and a polymerization degree of 2 to 10,000, (3) silanols of the general formula $R^3_lSi(OH)_{4-l}$ (wherein $R^3$ represents an alkyl, aryl, or cycloalkyl group or a hydrogen atom, and l is 1, 2 or 3) or condensation products thereof, (4) silicon compounds represented by the general formula $R^4_mSi(OR^5)_{4-m}$ (wherein $R^4$ represents an alkyl, aryl, cycloalkyl, or alkenyl group or a hydrogen atom, $R^5$ represents an alkyl or aryl group or a fatty acid moiety, and m is 1, 2 or 3), and (5) silicon compounds or polymers thereof represented by the general formula $[SiO_a(OR^6)_b]_n$ (wherein $R^6$ represents an alkyl, cycloalkyl, aralkyl or aryl group or a fatty acid moiety, and a and b are each a number defined by the formula $0 \leq a \leq 1$ or $2 \leq b \leq 4$, and n is an integer of from 1 to 10,000), with (B) a compound of a transition metal of Groups IVa, Va and VIa of the periodic table to form a reaction mixture (I), further reacting the reaction mixture (I) with (C) an organomagnesium compound selected from organomagnesium compounds or hydrocarbon-soluble complexes thereof with an organometallic compound capable of solubilizing said organomagnesium compounds, to produce an intermediate product (II) and contacting the intermediate product (II) with (D) an organoaluminum halide represented by the general formula $R^7_cAlX_{3-c}$ (wherein $R^7$ represents an organic group having 1 to 20 carbon atoms, X represents a halogen, and c is a number defined by the formula $0<c<3$) to form the hydrocarbon-insoluble product (III).

The halogen-containing silicon compounds [(A)(1)] suitable for use according to this invention include (i) those represented by the general formula $R_lSi(OR')_mH_nX_x$ (wherein R represents an alkyl, aryl or alkenyl group; R' represents an alkyl or aryl group or a fatty acid moiety; X represents a halogen atom; l, m and n are numbers defined by the formulas $0 \leq l$, m, $n \leq 3$ and $1 \leq x \leq 4$, and $l+m+n+x=4$), such as, for example, $SiCl_4$, $CH_3SiCl_3$, $C_6H_5SiCl_3$, $CH_3SiCl_2H$, $SiHCl_3$ and $Si(OC_2H_5)Cl_3$, (ii) chlorosiloxanes represented by the general formula $Si_nO_{n-1}Cl_{2n+2}$ (wherein n is a number defined by the formula $2 \leq n \leq 7$), such as, for example, $Si_2OCl_6$, and (iii) halogenated polysilanes represented by the general formula $Si_nX_{2n+2}$ (wherein X represents a halogen atom and n is a number defined by the formula $2 \leq n \leq 6$), such as, for example, $Si_4Cl_{10}$. Of the above compounds, $SiCl_4$ is especially preferred.

As examples of the compounds [(A)(2)], mention may be made of hexamethyldisiloxane, tetramethyldisiloxane, trimethylcyclotrisiloxane, dimethylpolysiloxane, diphenylpolysiloxane, methylhydropolysiloxane, phenylhydropolysiloxane, chlorophenylpolysiloxane, and ethoxyhydropolysiloxane. The polysiloxanes may have a chain, cyclic or reticulate structure. Convenient for use is a liquid polysiloxane having a viscosity of 1 to 10,000, preferably 1 to 1,000, centistokes at 25° C. A solid state polysiloxane may also be used.

Examples of silanols or polysilanols [(A)(3)] are $(CH_3)_3SiOH$, $(C_2H_5)_3SiOH$, $(C_6H_5)_3SiOH$, $(C_6H_5)_2Si(OH)_2$, and polysilanols.

Examples of the silicon compounds [(A)(4)] are $CH_3Si(OCH_3)_3$, $CH_3Si(OC_2H_5)_3$, $CH_3CH_2CH_2Si(OCH_3)_3$, $C_6H_5Si(OCH_3)_3$, $(CH_3)_2Si(OCH_3)_2$ and $CH_3Si(OCOCH_3)_3$.

As examples of the silicon compounds [(A)(5)], mention may be made of $Si(OCH_3)_4$, $Si(OC_2H_5)_4$, $Si(OC_3H_7)_4$, $Si(OC_4H_9)_4$, $Si(OC_6H_5)_4$, tetraacetoxysilane, dimethoxypolysiloxane, diethoxypolysiloxane, and diphenoxypolysiloxane. The polymer products may have a chain, cyclic or reticulate structure. Convenient for use is a liquid product having a viscosity of 1 to 10,000, preferably 1 to 1,000, centistokes, although a solid product may also be used.

The compounds (B) of transition metals ($M^1$) of Groups IVa, Va and VIa of the periodic table suitable for use are those of the general formula $[M^1O_p(OR^8)_qX_r]_d$ (wherein $R^8$ represents an organic group having 1 to 20 carbon atoms, X represents a halogen atom, p is a number defined by the formula $0 \leq p \leq 1.5$, q and r are numbers defined by the formulas $0 \leq q \leq 4$ and $0 \leq r \leq 4$, and d is an integer). The compounds of the said formula in which $0 \leq p \leq 1$ and $1 \leq d \leq 10$ are preferred. $R^8$ may be saturated or unsaturated and may contain a halogen, silicon, oxygen, nitrogen, sulfur, or phosphorus atom. $R^8$ is selected preferably from alkyl, cycloalkyl, aryl, aralkyl, alkenyl, and acyl groups and substituted derivatives thereof. $M^1$ is selected preferably from Ti, V, Zr and Hf, most preferably from Ti and Zr. Examples of the compounds (B) include $Ti(OC_2H_5)_4$, $Ti(O-n-C_3H_7)_4$, $Ti(O-iso-C_3H_7)_4$, $Ti(O-n-C_4H_9)_4$, $Ti(O-sec-C_4H_9)_4$, $Ti(O-tert-C_4H_9)_4$, $Ti(OC_6H_5)_4$, $Ti(OC_6H_4CH_3)_4$, $Ti(OC_6H_4Cl)_4$, $TiO(OC_2H_5)_2$,

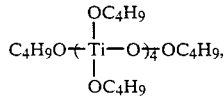

$TiOCl_2$, $Ti(OC_2H_5)_3Cl$, $Ti(OC_2H_5)_2Cl_2$, $Ti(OC_2H_5)Cl_3$, $Ti(OC_6H_5)Cl_3$, $TiCl_4$, $TiBr_4$, $Zr(OC_2H_5)_4$, $Zr(O-n-C_3H_7)_4$, $Zr(O-iso-C_3H_7)_4$, $Zr(O-n-C_4H_9)_4$, $Zr(O-sec-C_4H_9)_4$, $Zr(O-tert-C_4H_9)_4$, $Zr(OC_6H_5)_4$, $Zr(OC_6H_4CH_3)_4$, $Zr(OC_6H_4Cl)_4$, $ZrO(OC_2H_5)_2$,

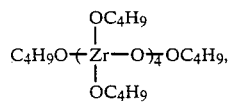

$ZrOCl_2$, $Zr(OC_2H_5)_3Cl$, $Zr(OC_2H_5)_2Cl_2$, $Zr(OC_2H_5)Cl_3$, $ZrCl_4$, $ZrBr_4$, $VOCl_3$, $VCl_4$, $VO(OC_2H_5)_3$, $VO(O-iso-C_3H_7)_3$, $VO(O-n-C_4H_9)_3$, $VO(O-iso-C_4H_9)_3$, and $HfCl_4$. Of these compounds, especially preferred are those of the above formula in which r=0.

It is also possible to use a combination of two or more compounds (B). By use of a combination of two or more compounds of different transition metals ($M^1$), it is possible to obtain a solid catalyst component which gives a polymer of broad molecular weight distribution. A combination suitable for this purpose is that of Ti and Zr compounds. The suitable atomic ratio, Ti:Zr, is generally from 1:50 to 50:1, preferably from 1:20 to 20:1, most preferably from 1:10 to 10:1.

The organomagnesium compound (C) may be any of the organomagnesium compounds having a magnesium-carbon bond. Especially preferred are Grignard compounds represented by the general formula $R^9MgX$ (wherein $R^9$ represents a hydrocarbon radical of 1 to 20 carbon atoms and X represents a halogen atom) and dialkylmagnesium compounds or diarylmagnesium compounds represented by the general formula $R^{10}R^{11}Mg$ (wherein $R^{10}$ and $R^{11}$, which may be the same or different, represent each a hydrocarbon radical having 1 to 20 carbon atoms). The organic groups $R^{10}$ and $R^{11}$ include those alkyl, aryl, aralkyl and alkenyl groups which have 1 to 20 carbon atoms such as methyl, ethyl, n-propyl, isopropyl, n-butyl, sec-butyl, tert-butyl, n-amyl, isoamyl, n-hexyl, n-octyl, 2-ethylhexyl, phenyl, and benzyl. Examples of individual Grignard compounds include methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, n-amylmagnesium chloride, isoamylmagnesium chloride, phenylmagnesium chloride, and phenylmagnesium bromide. Examples of the compounds of the formula $R^{10}R^{11}Mg$ are diethylmagnesium, di-n-propylmagnesium, diisopropylmagnesium, di-n-butylmagnesium, di-sec-butylmagnesium, di-tert-butylmagnesium, n-butyl-sec-butylmagnesium, di-n-amylmagnesium, and diphenylmagnesium. Alkyl- or aryl-magnesium-alkoxides or -aryloxides may also be used as organomagnesium compound.

The solvents generally used in the synthesis of the above organomagnesium compounds are those of the ether type such as, for example, diethyl ether, di-n-propyl ether, diisopropyl ether, di-n-butyl ether, diisobutyl ether, di-n-amyl ether, diisoamyl ether, di-n-hexyl ether, di-n-octyl ether, diphenyl ether, dibenzyl ether, phenetole, anisole, tetrahydrofuran, and tetrahydropyran. It is also possible to use hydrocarbon solvents such as, for example, hexane, heptane, octane, cyclohexane, methylcyclohexane, benzene, toluene, and xylene, or mixtures of these hydrocarbons and ethers. The organomagnesium compound is used preferably in the form of ether solution or ether complex. It is advantageous to the production of polymer particles in the form of approximated sphere or elongated sphere having a narrow particle size distribution to use an ether having 6 or more carbon atoms or a cyclic ether. It is preferred to use a Grignard compound of the formula $R^9MgCl$ in the form of an ether solution or ether complex. It is also possible to use as the component (C) a hydrocarbon-soluble complex of an organomagnesium compound with an organometallic compound capable of solubilizing the organomagnesium compound. Examples of such organometallic compounds are those of lithium, beryllium, boron, aluminum or zinc.

The organoaluminum halides used as the component (D) are those represented by the general formula $R^7_c AlX_{3-c}$ (wherein $R^7$ represents an organic group, particularly a hydrocarbon group, having 1 to 20, preferably 1 to 6, carbon atoms, X represents a halogen atom, and c is a number defined by the formula $0<c<3$). X is preferably a chlorine atom, and c is preferably a number defined by $1 \leq c \leq 2$, most preferably $c=1$. $R^7$ is selected preferably from alkyl, cycloalkyl, aryl, aralkyl, and alkenyl groups. As examples, mention may be made of ethylaluminum dichloride, isobutylaluminum dichloride, ethylaluminum sesquichloride, isobutylaluminum sesquichloride, diethylaluminum monochloride, and isobutylaluminum monochloride. Of these comopodnds, particularly preferred are alkylaluminum dichlorides such as ethylaluminum dichloride and isobutylaluminum dichloride. A mixture of two or more different organoaluminum halides may also be used. It is also possible to adjust the halogen content by use of a trialkylaluminum such as triethylaluminum or triisobutylaluminum or a trialkenylaluminum in combination with an organoaluminum halide.

The synthesis of a solid catalyst component is carried out always under an inert gas atmosphere such as nitrogen or argon. The reaction between a silicon compound [component (A)] and a compound of a transition metal of Groups IVa, Va and VIa of the periodic table [component (B)] is allowed to proceed either without using a reaction medium or in a suitable solvent or diluent at a temperature of generally $-50°$ to $150°$ C. for several minutes to several hours. The order of the addition of both reactants is free of restriction, namely, (A) may be added to (B) or (B) may be added to (A) or both may be added simultaneously to the reaction medium. The ratio of (A) in terms of silicon atom to (B) in terms of transition metal ($M^1$) atom is from 1:50 to 50:1, preferably from 1:20 to 20:1, most preferably from 1:10 to 10:1. Examples of the solvents suitable as the reaction media include aliphatic hydrocarbons such as pentane, hexane, heptane, and octane, aromatic hydrocarbons and its derivatives such as benzene, toluene, xylene, and chlorobenzene, alicyclic hydrocarbons such as cyclohexane and cyclopentane, and ethers such as diethyl ether, dibutyl ether, and tetrahydrofuran. These solvents are used each alone or in combinations. The reaction mixture (I) is generally a homogeneous solution, but occasionally contains insoluble matters.

The reaction mixture (I) is then allowed to react with an organomagnesium compound (C) to obtain an intermediate product (II). This reaction proceeds by mixing the reaction mixture (I) and the reactant (C) as such or in a suitable solvent or diluent and keeping the resulting mixture at generally $-70°$ to $150°$ C., preferably $-30°$ to $50°$ C. for several minutes to several hours, preferably for 30 minutes to 5 hours. The order of the addition of both reactants is free of restriction, namely, (I) may be added to (C) or (C) may be added to (I) or both may be added simultaneously to the reaction medium. The ratio of (I) in terms of the sum of silicon atom and transition metal atom to (C) in terms of magnesium atom is from 1:10 to 10:1, preferably from 1:5 to 5:1, most preferably from 1:2 to 2:1. Examples of the solvents suitable as the reaction media include aliphatic hydrocarbons such as pentane, hexane, heptane and octane, aromatic hydrocarbons such as benzene, toluene and xylene, alicyclic hydrocarbons such as cyclohexane and cyclopentane, and ethers such as ethyl ether, dibutyl ether, tetrahydrofuran, and dioxane. These solvents are used each alone or in combinations.

The intermediate product (II) thus obtained is, in most cases, a solid substance insoluble in the solvent, but is sometimes obtained as dissolved in the reaction medium, depending on the type of reactants and the solvent. The product in the solution form can be isolated as a solid by precipitating from the solution with a precipitant, by the temperature change, removal of the solvent by distillation, or reprecipitation.

The intermediate product (II) is then contacted with an organoaluminum halide [component (D)] either without being isolated or after having been isolated by evaporation of the reaction mixture to dryness or by filtration followed by drying or by filtration and subsequent thorough washing with a solvent. The contact is effected either directly in the absence of a solvent or in a solvent or diluent at a temperature of generally $-70°$ to $200°$ C., preferably $-30°$ to $150°$ C., most preferably $30°$ to $100°$ C. for several minutes to several hours. The order of the addition of both reactants is free of any restriction, namely, (D) may be added to (II), or (II) may be added to (D) or both may be added simultaneously to the reaction medium. The ratio between (II) and (D) can be selected from a wide range. By changing the ratio, it is possible to adjust the molecular weight distribution of the polymer. The molecular weight distribution of a polymer may be made broader by increasing the ratio of (D) to (II). It is generally preferred to select the quantity of (D) in terms of halogen atom content per g of (II) from the range of from 0.01 to 0.1 gram equivalent. Examples of the solvents suitable as the reaction medium include aliphatic hydrocarbons such as pentane, hexane, heptane and octane, halohydrocarbons such as carbon tetrachloride and dichloroethane, aromatic hydrocarbons and its derivatives such as benzene, toluene, xylene and chlorobenzene, and alicyclic hydrocarbons such as cyclohexane and cyclopentane. These solvents are used each alone or in combinations.

The hydrocarbon-insoluble product (III) thus obtained is a powder, each particle being in the form of approximated sphere or elongated sphere, having a narrow particle size distribution and good flowability. It contains magnesium, a transition metal of Groups IVa, Va or VIa of the periodic table, and a halogen. It is generally amorphous or feebly crystalline, showing scarcely any X-ray diffraction peak, or only broad or feeble diffraction peaks at interplanar spacings (d) of 5.9, 2.8 and 1.8 Å. The hydrocarbon-insoluble product (III) formed by the contact of the intermediate reaction product (II) and the component (D) is generally used as a catalyst component in the olefin polymerization after having been separated from the reaction medium by filtration, washed thoroughly with a hydrocarbon diluent, and dried or without being dried.

In polymerizing or copolymerizing an olefin, the hydrocarbon-insoluble reaction product (III) according to this invention is used in combination with an organometallic compound of a metal of Groups I, II and III of the periodic table. As examples of such organometallic compounds, mention may be made of organoaluminum compounds including trialkylaluminums such as triethylaluminum, tri-n-propylaluminum, tri-n-butylaluminum, triisobutylaluminum, and tri-n-hexylaluminum; dialkylaluminum monohalides such as diethylaluminum monochloride, di-n-propylaluminum monochloride, di-n-butylaluminum monochloride, diisobutylaluminum monochloride, and di-n-hexylaluminum monochloride; alkylaluminum dihalides such as ethylaluminum dichloride, n-propylaluminum dichloride, n-butylaluminum dichloride, isobutylaluminum dichloride, and n-hexylaluminum dichloride; alkylaluminum sesquihalides such as ethylaluminum sesquichloride, n-propylaluminum sesquichloride, n-butylaluminum sesquichloride, isobutylaluminum sesquichloride, and n-hexylaluminum sesquichloride; trialkenylaluminums such as triisoprenylaluminum; alkoxyaluminums such as diethylaluminum ethoxide, dibutylaluminum butoxide, ethylaluminum sesquiethoxide, and butylaluminum sesquibutoxide; alkoxyaluminum halides such as ethylaluminum ethoxychloride and butylaluminum butoxychloride; alkylaluminum hydrides such as diethylaluminum hydride, dibutylaluminum hydride, ethylaluminum dihydride, and butylaluminum dihydride; organozinc compounds such as diethylzinc; organomagnesium compounds such as diethylmagnesium and ethylmagnesium chloride; and $LiAl(C_2H_5)_4$. Of these compounds, especially preferred are trialkylaluminums, alkylaluminum halides, or mixtures thereof.

The solid catalyst component of this invention is suitable for use in the polymerization of terminally unsaturated olefins having 2 to 20, preferably 2 to 10, carbon atoms such as, for example, ethylene, propylene, butene-1, 4-methylpentene-1, hexene-1 and octene-1. It is also suitable for the copolymerization of two or more of these olefins and the copolymerization of these olefins with diolefins having 4 to 20 carbon atoms such as, for example, 1,4-hexadiene, 1,7-octadiene, vinylcyclohexene, 1,3-divinylcyclohexene, cyclopentadiene, 1,5-cyclooctadiene, dicyclopentadiene, norbornadiene, 5-vinylnorbornene, ethylidenenorbornene, butadiene, and isoprene. The present solid catalyst component is advantageously adaptable especially to the homopolymerization of ethylene or copolymerization of 90 mole-% or more of ethylene with other olefins such as preferably propylene, butene-1, 4-methylpentene-1, hexene-1, and octene-1. For the purpose of adjusting the stereoregularity and molecular weight distribution, an electron-donating compound such as those containing nitrogen, oxygen, or phosphorus can be added to the polymerization system.

The polymerization can be carried out by the customary method of slurry polymerization, gas-phase polymerization, solution polymerization, or melt polymerization. When the method of slurry polymerization or gas-phase polymerization is used, there is obtained a polymer powder in the particle form of approximated sphere or elongated sphere, corresponding to the desirable particle form of the present solid catalyst component, and the polymer powder has a narrow particle size distribution, a high bulk density, and a good flowability.

The polymerization temperature is generally from room temperature to 200° C., preferably 40° to 150° C. and the polymerization pressure is from atmospheric to 100 atmospheres, preferably atmospheric to 50 atmospheres, though the polymerization proceeds normally at higher temperatures and pressures. It is possible to use a molecular weight regulator such as, for example, hydrogen. The polymerization is carried out either continuously or batchwise. It is also feasible to carry out multistage polymerization using a solid catalyst component of this invention by means of a combination of multiple reaction zones of different polymerization conditions. A sufficient concentration of the present solid catalyst component in the polymerization system is usually 0.001 to 1 millimoles of the transition metal atom per 1 liter of the reaction medium or of the polymerization vessel. The organometallic compound as catalyst component is used in an amount within a broad range, but is generally in the range of 0.5 to 500, preferably 2 to 100, mole equivalents per mole of transition metal atom in the solid catalyst component. The inert solvents used as polymerization solvent in slurry polymerization and solution polymerization include aliphatic hydrocarbons such as propane, butane, pentane, hexane, heptane, and octane and alicyclic hydrocarbons such as cyclohexane and cycloheptane. It is also possible to use as the polymerization solvent the polymerizable monomers such as ethylene, propylene, butene-1, 4-methylpentene-1, hexene-1, and octene-1 themselves.

When the present solid catalyst component is used in the olefin polymerization, owing to a high activity of the catalyst per unit quantity of the transition metal as well as per unit quantity of the solid catalyst, the residual catalyst content of the resulting polymer becomes so small that the step of its removal is unnecessary; moreover the polymer build-up on the wall of polymerization vessel is much reduced. When slurry polymerization or gas-phase polymerization is carried out, there is formed a polymer powder comprising approximately spherical or elongated sphere-like particles having a narrow particle size distribution and a desirable flowability, which no longer requires pelletization. Thus, the polymerization efficiency is high and the operation steps are simplified. Since the molecular weight of the resulting polymer can be controlled by properly selecting the type and quantity of each component used in the preparation of the present solid catalyst component, it is possible to prepare various polymers suitable for a wide range of specific uses such as injection molding, rotational molding, extrusion molding, film extrusion, and blow molding.

The invention is further illustrated below in detail with reference to Examples, but the invention is not limited thereto, unless it departs from the essential feature of the invention. In Examples, the polymer properties were tested as described below.

The density and bulk density were tested according to the methods specified in JIS K 6760 and K 6721, respectively.

The melt flow ratio (MFR) was used as a measure for the melt flowability. According to the method for testing melt index specified in ASTM D 1238-57T, MFR is expressed as a ratio of the flow rate under a load of 2.160 kg to that (MI) under a load of 21.60 kg:

$$MFR = \frac{\text{Flow rate under 21.60 kg load}}{\text{Flow rate under 2.160 kg load}}.$$

It has been known that, in general, the broader the molecular weight distribution, the larger the value of MFR.

EXAMPLE 1

(1) Synthesis of organomagnesium compound.

Into a 1-liter flask provided with a stirrer, reflux condenser, dropping funnel, and thermometer, was placed 32.0 g of magnesium turnings for Grignard reagent. After removing the air and moisture from the flask by the thorough flushing with nitrogen, 120 g of n-butyl chloride and 500 ml of di-n-butyl ether were charged into the dropping funnel. About 30 ml of the mixture in the dropping funnel was added dropwise onto the magnesium to initiate the reaction. The dropwise addition of the remainder of the mixture was continued at 50° C. for about 4 hours. After completion of the addition, the mixture in the flask was allowed to react for another hour at 60° C. The reaction mixture was then cooled down to room temperature and the insolubles were removed by filtration. The concentration of n-butylmagnesium chloride in the di-n-butyl ether (filtrate) was found to be 2.03 moles/liter, as determined by the hydrolysis of n-butylmagnesium chloride with 1 N sulfuric acid followed by the back-titration with 1 N aqueous sodium hydroxide solution using phenolphthaline as the indicator.

(2) Syntheses of reaction mixture (I) and intermediate product (II)

To a solution of 15.0 g (43.9 mmol) of $Ti(O-n-C_4H_9)_4$ in 150 ml of n-heptane, was added 28.9 ml [48.3 mmol of $Zr(O-n-C_4H_9)_4$] of a solution of $Zr(O-n-C_4H_9)_4$ in n-heptane. To the mixture, after having been stirred for 10 minutes at room temperature, was added dropwise at room temperature 20.1 g (96.6 mmol) of $Si(OC_2H_5)_4$ over a period of 15 minutes. The mixture was then stirred at room temperature for 20 minutes to yield the reaction mixture (I) as a pale yellow homogeneous solution. To the reaction mixture (I), while being cooled at 5° C., was added dropwise over a period of 35 minutes 93.0 ml (189 mmol) of a solution of $n-C_4H_9MgCl$ in n-butyl ether prepared above in (1). With the dropwise addition, the reaction mixture turned brown and a solid product precipitated out. After completion of the dropwise addition, the reaction was allowed to continue for further two hours. After removing the liquid phase, the solid product was washed 5 times with 350 ml of n-heptane, and dried at room temperature under reduced pressure to yield 31.2 g of the intermediate product (II) as a brown powder. Elementary analysis: 4.5% Ti, 8.8% Zr, 9.5% Mg, 13.3% Cl, and 0.7% of $(n-C_4H_9)_2O$ (all percentages are by weight).

(3) Synthesis of solid catalyst component.

To 5.0 g of the intermediate product (II) prepared above in (2), after diluting with 18 ml of n-heptane, was added at 60° C. dropwise over a period of 30 minutes 36.1 ml (125 mmol of $C_2H_5AlCl_2$) of a solution of $C_2H_5AlCl_2$ in n-heptane. After completion of the dropwise addition, the reaction was allowed to continue for another hour at 65° C. After completion of the reaction and removal of the liquid phase by filtration, the solid product was washed 5 times with 50 ml of n-heptane, and dried at room temperature under reduced pressure to yield 2.6 g of the reaction product (III) as a brown powder. Upon analysis, the reaction product (III) was found to contain 5.7% Ti, 11.8% Zr, 13.2% Mg, 62.1% Cl, and 3.1% Al (all percentages are by weight). X-ray diffraction pattern of the reaction product (III) showed only weak broad diffraction peaks in the vicinity of interplanar spacings (d) of 5.9, 2.8 and 1.8 Å. The microscopic observation revealed that the powder particles were approximately spherical and showed a narrow particle size distribution.

(4) Polymerization of ethylene.

Into a 1-liter autoclave provided with an electromagnetic induction stirrer, which had been thoroughly flushed with nitrogen, were added 500 ml of n-heptane and 1.0 mmol of triisobutylaluminum. Into the autoclave, after the temperature had been elevated to 80° C., was charged hydrogen to a total pressure of 5 kg/cm$^2$ followed by ethylene to a total pressure of 15 kg/cm$^2$. The polymerization was initiated by the addition of 8.2 mg of the solid catalyst component prepared above in (3). Ethylene was continuously fed to the autoclave to maintain the total pressure constant at 80° C. for one hour. After the addition of 2 ml of isobutyl alcohol to terminate the polymerization, the polymer which was formed was collected by filtration and dried at 60° C. under reduced pressure. The yield of polymer amounted to 67.1 g. The polymerization activity was 8,180 g polymer/g solid catalyst/hour and 46,800 g polymer/g transition metal/hour. The melt index was 0.27 g/10 minutes, MFR 80, and the bulk density 0.39 g/cm$^3$. The polymer powder was approximately spherical in particle shape and showed a narrow particle size distribution and good flowability.

EXAMPLE 2

The polymerization of ethylene was carried out in the same manner as in Example 1 (4), except that 1.0 mmol of triethylaluminum was used in place of the triisobutylaluminum and 6.8 mg of the solid catalyst component was used. There were obtained 63.2 g of the polymer. The catalyst activity was 9,290 g polymer/g solid catalyst/hour and 53,100 g polymer/g transition metal/hour. The MI of the polymer was 0.34 g/10 minutes, MFR 68, and the bulk density 0.38 g/cm$^3$. The particles of the polymer powder were approximately spherical and showed a narrow particle size distribution and good flowability.

EXAMPLE 3

The polymerization of ethylene was carried out in the same manner as in Example 1 (4), except that there were used 1.0 mmol of diethylaluminum monochloride in place of the triisobutylaluminum, 5.8 mg of the solid catalyst component, a hydrogen pressure of 10 kg/cm$^2$, and a total pressure of 20 kg/cm$^2$. There were obtained 50.7 g of the polymer. The catalyst activity was 3,210 g polymer/g solid catalyst/hour and 18,300 g polymer/g transition metal/hour. The polymer had a MI of 0.26 g/10 minutes, MFR of 66 and a bulk density of 0.41 g/cm$^3$. The polymer powder was approximately spherical in particle shape and showed a markedly narrow particle size distribution and good flowability.

EXAMPLE 4

Into a 1-liter autoclave provided with an electromagnetic induction stirrer, which had been thoroughly flushed with nitrogen, were charged 200 g of butane, 1.0 mmol of triisobutylaluminum and 50 g of butene-1. Into the autoclave, after the temperature had been elevated to 70° C., was charged hydrogen to a total pressure of 5 kg/cm$^2$ followed by ethylene to a total pressure of 15 kg/cm$^2$. The polymerization was initiated by the addition of 6.2 mg of the solid catalyst component prepared in Example 1 (3). Ethylene was charged continuously to the autoclave to maintain the total pressure constant at 70° C. for 1 hour to effect the copolymerization of ethylene with butene-1. After completion of the polymerization, the polymer which was formed was collected by filtration and dried at 60° C. under reduced pressure. The yield of polymer was 58.4 g. The catalyst activity was 9,420 g polymer/g solid catalyst/hour and 53,800 g polymer/g transition metal/hour. The copolymer contained 18.6 ethyl groups per 1,000 carbon atoms. It showed a density of 0.924 g/cm$^3$, MI of 0.41 g/10 minutes, MFR of 71 and a bulk density of 0.37 g/cm$^3$. The polymer powder was approximately spherical in particle shape and showed a narrow particle size distribution and good flowability.

COMPARATIVE EXAMPLE 1

The polymerization of ethylene was carried out in the same manner as in Example 1 (4), except that 16.1 mg of the intermediate product (II) prepared in Example 1 (2) was used as the solid catalyst component. There was obtained only a trace amount of a polymer.

COMPARATIVE EXAMPLE 2

The polymerization of ethylene was carried out in the same manner as in Example 3, except that 13.7 mg of the intermediate product (II) prepared in Example 1 (2) was used as the solid catayst component. There was obtained 39.7 g of a polymer. The catalyst activity was 2,900 g polymer/g solid catalyst/hour and 21,800 g polymer/g transition metal/hour. The polymer had MI of 0.31 g/10 minutes, MFR of 37, and a bulk density of 0.25 g/cm$^3$. As compared with the results obtained in Example 3, the catalyst activity was inferior and the polymer powder was inferior in bulk density and flowability and showed a narrower molecular weight distribution.

CPMPARATIVE EXAMPLE 3

(1) Synthesis of solid catalyst component.

The reaction mixture (I) was obtained in the same manner as in Example 1 (2), except that the amount used of each reagent was one-third. To the reaction mixture (I), was added dropwise at 60° C. over a period of 30 minutes 75.1 ml (260 mmol $C_2H_5AlCl_2$) of a solution of $C_2H_5AlCl_2$ in n-heptane. After the addition, the mixture was allowed to react for one hour at 65° C. After completion of the reaction, the liquid phase was removed by filtration and the solid product was washed 5 times with 70 ml of n-heptane and dried at room temperature under reduced pressure to obtain 6.8 g of a solid catalyst component which was found, upon analysis, to contain 9.1% by weight of titanium and 19.0% by weight of zirconium.

(2) Polymerization of ethylene.

The polymerization of ethylene was carried out in the same manner as in Example 1 (4), except that 18.4 mg of the solid product obtained above in (1) was used as the solid catalyst component. There were obtained 30.2 g of a polymer. The catalyst activity was 1,640 g polymer/g solid catalyst/hour and 5,840 g polymer/g transition metal/hour. The polymer had MI of 0.067 g/10 minutes, MFR of 71, and a bulk density of 0.23 g/cm$^3$. The catalyst activity was low and the polymer powder was unsatisfactory in bulk density and flowability.

COMPARATIVE EXAMPLE 4

(1) Synthesis of solid catalyst component.

To a solution of 10.0 g (29.3 mmol) of Ti(O-n-$C_4H_9$)$_4$ in 30 ml of n-heptane, was added 20.1 ml [32.2 mmol Zr(O-n-$C_4H_9$)$_4$] of a solution of Zr(O-n-$C_4H_9$)$_4$ in n-heptane. The mixture was stirred for 10 minutes at room temperature. To the mixture, while being maintained at 5° C., was added dropwise over a period of 30 minutes 30.3 ml (61.5 mmol n-$C_4H_9$MgCl) of a solution of n-$C_4H_9$MgCl prepared in Example 1 (1) in n-butyl ether. With the dropwise addition, the reaction mixture turned brown and a solid product was formed. After completion of the addition, the mixture was allowed to continue the reaction at room temperature for two more hours. The liquid phase was then removed by filtration, and the solid product was washed 5 times with 200 ml of n-heptane and dried at room temperature under reduced pressure to yield 13.9 g of a brown powder. A 5.2 g portion of the powder was weighed out and admixed with 19 ml of n-heptane. To the mixture, was added dropwise at 60° C. over a period of 30 minutes 37.5 ml (130 mmol $C_2H_5AlCl_2$) of a solution of $C_2H_5AlCl_2$ in n-heptane. After completion of the addition, the mixture was allowed to react at 65° C. for 1 hour. After completion of the reaction, the liquid phase was removed by filtration and the solid product was washed 5 times with 50 ml of n-heptane and dried at room temperature under reduced pressure to yield 3.2 g of a brown powder which was found, upon analysis, to contain 8.9% by weight of titanium and 17.1% by weight of zirconium.

(2) Polymerization of ethylene.

The polymerization of ethylene was carried out in the same manner as in Example 1 (4), except that 6.9 mg of the brown powder was used as the solid catalyst component. There were obtained 51.9 g of a polymer. The catalyst activity was 7,520 g polymer/g solid catalyst/hour and 28,900 g polymer/g transition metal/hour. The polymerization activity per g transition metal was unsatisfactory. The polymer was found to have MI of 0.16 g/10 minutes, MFR of 80, and a bulk density of 0.27 g/cm$^3$. The polymer was unsatisfactory with respect to the bulk density and flowability.

COMPARATIVE EXAMPLE 5

(1) Synthesis of solid catalyst component.

A solid catalyst component was prepared by use of the same compounds in the same ratios as in Example 1 (2) and (3), but by a different procedure.

To a solution of 20.1 g (96.6 mmol) of Si(O$C_2H_5$)$_4$ in 150 ml of n-heptane, while being maintained at 5° C., was added dropwise over a period of 35 minutes 93.0 ml (189 mmol n-$C_4H_9$MgCl) of the n-butyl ether solution of n-$C_6H_9$MgCl prepared in Example 1 (1). With the dropwise addition, there was formed a white solid product. After the addition, the mixture was allowed to continue the reaction for another hour at 5° C. To the resulting suspension, while being maintained at 5° C., was added dropwise over a period of 30 minutes 50 ml of a n-heptane solution containing 43.9 mmol of Ti(O-n-$C_4H_9$)$_4$ and 48.3 mmol of Zr(O-n-$C_4H_9$)$_4$. With the dropwise addition, the suspension was turned brown. After completion of the addition, the mixture was allowed to continue the reaction for 2 more hours at room temperature. The liquid phase was removed by filtration and the solid product was washed 5 times with 300 ml of n-heptane and dried at room temperature to yield 27.5 g of a brown powder which was found, upon analysis, to contain 4.1% by weight of titanium and 8.0% by weight of zirconium. A 5.7 g portion of the brown powder was weighed out and admixed with 20 ml of n-heptane. To the mixture, was added dropwise over a period of 30 minutes at 60° C. 41.2 ml (143 mmol $C_2H_5AlCl_2$) of a n-heptane solution containing $C_2H_5AlCl_2$. After the addition, the mixture was allowed to react at 65° C. for another hour. After completion of the reaction, the liquid phase was removed by filtration and the solid product was washed 5 times with 60 ml of n-heptane and dried at room temperature under reduced pressure to yield 3.3 g of a brown powder which was found, upon analysis, to contain 5.3% by weight of titanium and 10.3% by weight of zirconium.

(2) Polymerization of ethylene.

The polymerization of ethylene was carried out in the same manner as in Example 1 (4). There were obtained 50.8 g of a polymer. The catalyst activity was 5,560 g polymer/g solid catalyst/hour and 35,800 g polymer/g transition metal/hour. The polymer was found to have MI of 0.21 g/10 minutes, MFR of 68, and a bulk density of 0.24 g/cm$^3$. The polymer powder showed a broad particle size distribution and was unsatisfactory in bulk density and powder flowability.

EXAMPLES 5 to 16

In a manner similar to that in Example 1, various solid catalyst components were prepared from various compounds and the polymerization of ethylene was carried out in the presence of these solid catalyst components. The conditions for the preparation of these solid catalyst components were as shown in Table 1 and the results of ethylene polymerization were as shown in Table 2.

TABLE 1

| | Preparation of intermediate product (II) | | | | | |
|---|---|---|---|---|---|---|
| | Component (A) | | Component (B) | | Component (C) | |
| Example No. | Compound | Amount used (Si gram atom) | Compound | Amount used (mol) | Compound (reaction medium) | Amount used (mol) |
| 5 | Si(O—n-Bu)$_4$ | 0.085 | Ti(O—n-Bu)$_4$ | 0.057 | n-BuMgCl | 0.170 |
| | | | Zr(O—n-Bu)$_4$ | 0.028 | ((n-Bu)$_2$O) | |
| 6 | " | " | Ti(O—n-Bu)$_4$ | 0.028 | n-BuMgCl | " |
| | | | Zr(O—n-Bu)$_4$ | 0.057 | ((n-Bu)$_2$O) | |
| 7 | " | " | Ti(O—n-Bu)$_4$ | 0.014 | n-BuMgCl | " |
| | | | Zr(O—n-Bu)$_4$ | 0.071 | ((n-Bu)$_2$O) | |
| 8 | " | " | Ti(O—n-Bu)$_4$ | 0.008 | n-BuMgCl | " |
| | | | Zr(O—n-Bu)$_4$ | 0.077 | ((n-Bu)$_2$O) | |
| 9 | Si(OEt)$_4$ | 0.120 | Ti(O—n-Bu)$_4$ | 0.006 | n-BuMgCl | 0.126 |
| | | | | | ((n-Bu)$_2$O) | |
| 10 | " | 0.080 | Zr(O—n-Bu)$_4$ | 0.016 | n-BuMgCl | 0.096 |
| | | | | | ((n-Bu)$_2$O) | |
| 11 | Si(O—n-Bu)$_4$ | 0.085 | Ti(O—n-Bu)$_4$ | 0.028 | n-BuMgCl | 0.170 |
| | | | Zr(O—n-Bu)$_4$ | 0.057 | ((n-Bu)$_2$O) | |
| 12 | Si(O—n-Bu)$_4$ | " | Ti(O—n-Bu)$_4$ | 0.028 | n-BuMgCl | " |
| | | | Zr(O—n-Bu)$_4$ | 0.057 | ((n-Bu)$_2$O) | |
| 13 | Si(OC$_6$H$_5$)$_4$ | " | TiCl$_4$ | 0.028 | n-BuMgCl | " |
| | | | Zr(O—n-Pr)$_4$ | 0.057 | ((i-Pr)$_2$O) | |
| 14 | Diethoxy-polysiloxane | 0.090 | Ti(O—n-Bu)$_4$ | 0.009 | n-BuMgCl | 0.144 |
| | | | Zr(O—n-Bu)$_4$ | 0.045 | (Tetrahydrofuran) | |
| 15 | Si(OEt)$_4$ | 0.085 | Ti(OEt)$_4$ | 0.014 | (n-Bu)Mg(sec-Bu) | 0.170 |
| | | | Zr(O—n-Pr)$_4$ | 0.071 | (n-Heptane) | |
| 16 | " | 0.054 | TiCl$_4$ | 0.027 | n-BuMgCl | 0.108 |
| | | | VOCl$_3$ | 0.027 | ((n-Bu)$_2$O) | |

| | Preparation of hydrocarbon-insoluble product (III) | | | | Transition metal content of product (III) (% by weight) | |
|---|---|---|---|---|---|---|
| | | Component (D) | | | | |
| Example No. | Reaction medium | Compound | Amount used (mmol/g product (II)) | Reaction medium | | |
| 5 | n-Heptane | EtAlCl$_2$ | 20 | n-Heptane | Ti | 6.2 |
| | | | | | Zr | 6.9 |
| 6 | " | " | " | " | Ti | 4.1 |
| | | | | | Zr | 14.9 |
| 7 | " | " | " | " | Ti | 2.0 |
| | | | | | Zr | 18.2 |
| 8 | " | " | " | " | Ti | 1.2 |
| | | | | | Zr | 19.8 |
| 9 | " | " | 15 | " | Ti | 2.0 |
| 10 | " | " | " | " | Zr | 8.7 |
| 11 | " | " | " | " | Ti | 3.9 |
| | | | | | Zr | 13.2 |
| 12 | " | " | 25 | " | Ti | 4.2 |
| | | | | | Zr | 15.0 |
| 13 | Toluene | Et$_2$AlCl | 30 | " | Ti | 4.1 |
| | | | | | Zr | 14.0 |
| 14 | " | " | " | " | Ti | 1.8 |
| | | | | | Zr | 13.5 |
| 15 | n-Heptane | EtAlCl$_2$ | 20 | " | Ti | 2.1 |
| | | | | | Zr | 17.8 |
| 16 | " | " | 15 | " | Ti | 6.3 |
| | | | | | V | 6.0 |

Note:
Et = C$_2$H$_5$, n-Pr = n-C$_3$H$_7$, i-Pr = iso-C$_3$H$_7$, n-Bu = n-C$_4$H$_9$, sec-Bu = sec-C$_4$H$_9$

TABLE 2

| Example No. | Amount used of solid catalyst component (mg) | Organometallic compound | Polymerization temp. (°C.) | Yield of polymer (g) | Catalyst activity | | Bulk density (g/cm³) | MI (g/10 min.) | MFR |
|---|---|---|---|---|---|---|---|---|---|
| | | | | | g Polymer/g solid catalyst/hour | g Polymer/g transition metal/hour | | | |
| 5 | 3.3 | Triisobutylaluminum | 80 | 64.7 | 19,600 | 150,000 | 0.39 | 0.63 | 64 |
| 6 | 7.9 | Triisobutylaluminum | " | 62.9 | 7,960 | 41,900 | 0.39 | 0.23 | 92 |
| 7 | 7.8 | Triisobutylaluminum | " | 61.4 | 7,870 | 39,000 | 0.40 | 0.21 | 108 |
| 8 | 9.5 | Triisobutylaluminum | " | 50.8 | 5,350 | 25,500 | 0.40 | 0.10 | 112 |
| 9 | 3.1 | Triisobutylaluminum | " | 65.7 | 21,200 | 1,060,000 | 0.37 | 1.18 | 33 |
| 10 | 22.5 | Triisobutylaluminum | " | 45.7 | 2,030 | 23,300 | 0.39 | 0.25 | 177 |
| 11 | 6.2 | Triisobutylaluminum | " | 57.1 | 9,210 | 53,900 | 0.39 | 0.37 | 60 |
| 12 | 11.2 | Triisobutylaluminum | " | 53.9 | 4,810 | 25,100 | 0.40 | 0.095 | 92 |
| 13 | 6.8 | Triisobutylaluminum | " | 51.8 | 7,620 | 42,100 | 0.38 | 0.20 | 80 |
| 14 | 8.9 | Triisobutylaluminum | " | 60.2 | 6,760 | 44,200 | 0.36 | 0.23 | 71 |
| 15 | 7.7 | Triisobutylaluminum | " | 57.6 | 7,480 | 37,600 | 0.34 | 0.30 | 75 |
| 16 | 2.8 | Triisobutylaluminum | " | 64.0 | 22,900 | 186,000 | 0.34 | 1.32 | 40 |

EXAMPLE 17

(1) Preparation of organomagnesium compound.

A di-n-butyl ether solution (2.03 mol/liter) of n-$C_4H_9MgCl$ was prepared as in Example 1 (1).

(2) Synthesis of reaction mixture (I) and intermediate product (II).

To a solution of 12.0 g (35.0 mmol) of Ti(O-n-$C_4H_9$)$_4$ in 150 ml of n-heptane, was added 22.4 ml [35.0 mmol Zr(O-n-$C_4H_9$)$_4$] of a solution of Zr(O-n-$C_4H_9$)$_4$ in n-heptane. The mixture was stirred at room temperature for 10 minutes. To the mixture was added dropwise at room temperature over a period of 15 minutes 11.9 g (70.0 mmol) of $SiCl_4$. The mixture was stirred at room temperature for 20 minutes to form a pale brown homogeneous solution [reaction mixture (I)]. To the reaction mixture (I), while being maintained at 5° C., was added dropwise over a period of 35 minutes 69.0 ml (140 mmol n-$C_4H_9MgCl$) of a solution of n-$C_4H_9MgCl$ prepared above in (1) in n-butyl ether. With the dropwise addition, the reaction mixture turned dark brown and a solid product was formed. After completion of the addition, the mixture was allowed to continue the reaction at room temperature for 2 more hours. The liquid phase was removed by filtration and the solid product was washed 5 times with 300 ml of n-heptane and dried at room temperature under reduced pressure to yield 33.1 g of a brown powder [intermediate product (II)] which, upon analysis, was found to contain 6.2% by weight of titanium and 13.5% by weight of zirconium.

(3) Synthesis of solid catalyst component.

To a 5.0 g portion of the intermediate product (II) prepared above in (2), was added 15 ml of n-heptane. To the mixture, was added dropwise over a period of 30 minutes at 60° C. 28.9 ml (100 mmol $C_2H_5AlCl_2$) of a solution of $C_2H_5AlCl_2$ in n-heptane. After completion of the addition, the mixture was allowed to react at 65° C. for one hour. After completion of the reaction, the liquid phase was removed by filtration and the solid phase was washed 5 times with 50 ml of n-heptane and dried at room temperature under reduced pressure to yield 2.7 g of a brown powder [product (III)] which, upon analysis, was found to contain 6.4% by weight of titanium and 13.2% by weight of zirconium. The X-ray diffraction pattern showed only weak broad diffraction peaks in the vicinity of interplanar spacings (d) of 5.9, 2.8 and 1.8 Å. The microscopic examination revealed that the powder particles were approximately spherical in shape and of a narrow particle size distribution.

(4) Polymerization of ethylene.

The polymerization of ethylene was carried out in the same manner as in Example 1 (4), except that 6.9 mg of the solid catalyst component prepared above in (3) was used. The yield of polymer was 64.5 g. The polymerization activity was 9,350 g polymer/g solid catalyst/hour and 34,500 g polymer/g transition metal/hour. The polymer showed MI of 0.31 g/10 minutes, MFR of 81, and a bulk density of 0.39 g/cm³. The polymer powder was approximately spherical in particle shape and of a narrow particle size distribution and good flowability.

EXAMPLE 18

The polymerization of ethylene was carried out in the same manner as in Example 2, except that 7.0 mg of the solid catalyst component prepared in Example 17 (3) was used. The yield of polymer was 65.7 g. The catalyst activity was 9,390 g polymer/g solid catalyst/hour and 34,600 g polymer/g transition metal/hour. The polymer showed MI of 0.38 g/10 minutes, MFR of 70, and a bulk density of 0.39 g/cm³. The polymer powder was approximately spherical in particle shape and of a narrow particle size distribution and good flowability.

EXAMPLE 19

The polymerization of ethylene was carried out in the same manner as in Example 3, except that 14.3 mg of the solid catalyst component prepared in Example 17 (3). There were obtained 52.3 g of a polymer. The catalyst activity was 3,660 g polymer/g solid catalyst/hour and 13,500 g polymer/g transition metal/hour. The polymer showed MI of 0.13 g/10 minutes, MFR of 72, and a bulk density of 0.41 g/cm³. The polymer powder was approximately spherical in particle shape and of an extremely narrow particle size distribution and good flowability.

EXAMPLE 20

The copolymerization of ethylene with butene-1 was carried out in the same manner as in Example 4, except that 5.7 mg of the solid catalyst component prepared in Example 17 (3) was used. The yield of copolymer was 59.6 g. The catalyst activity was 10,500 g polymer/g solid catalyst component/hour and 38,600 g polymer/g transition metal/hour. The copolymer contained 18.3 ethyl groups per 1,000 carbon atoms and showed a density of 0.925 g/cm$^3$, MI of 0.47 g/10 minutes, MFR of 73, and a bulk density of 0.38 g/cm$^3$. The polymer powder was approximately spherical in particle shape and of a narrow particle size distribution and good flowability.

COMPARATIVE EXAMPLE 6

The polymerization of ethylene was carried out in the same manner as in Example 1 (4), except that 17.2 mg of the intermediate product (II) prepared in Example 17 (2). There were obtained 51.4 g of a polymer. The catalyst activity was 2,990 g polymer/g solid catalyst/hour and 11,000 g polymer/g transition metal/hour. The polymer showed MI of 0.58 g/10 minutes, MFR of 33, and a bulk density of 0.28 g/cm$^3$. As compared with the results of Example 1 (4), the catalyst activity was lower and the polymer was inferior in bulk density and powder flowability; the molecular weight distribution was also narrower.

COMPARATIVE EXAMPLE 7

The polymerization of ethylene was carried out in the same manner as in Example 3, except that 37.9 mg of the intermediate product (II) prepared in Example 17 (2) was used. There were obtained 45.8 g of a polymer. The catalyst activity was 1,210 g polymer/g solid catalyst/hour and 4,460 g polymer/g transition metal/hour. The polymer showed MI of 0.25 g/10 minutes, MFR of 34, and a bulk density of 0.29 g/cm$^3$. As compared with the results obtained in Example 19, the catalyst activity was lower and the polymer powder was inferior in bulk density and flowability and the molecular weight distribution was narrower.

COMPARATIVE EXAMPLE 8

(1) Synthesis of solid catalyst component.

The reaction mixture (I) was obtained in the same manner as in Example 17 (2), except that the amount used of each reagent was one-third. To the reaction mixture (I), was added dropwise over a period of 30 minutes at 60° C. 64 ml (220 mmol $C_2H_5AlCl_2$) of a solution of $C_2H_5AlCl_2$ in n-heptane. After completion of the addition the mixture was allowed to react at 65° C. for another hour. After completion of the reaction, the liquid phase was removed by filtration and the solid product was washed 5 times with 70 ml of n-heptane, and dried under reduced pressure at room temperature to yield 5.2 g of a solid catalyst component which, upon analysis, was found to contain 9.6% by weight of titanium and 18.1% by weight of zirconium.

(2) Polymerization of ethylene.

The polymerization of ethylene was carried out in the same manner as in Example 1 (4), except that 22.0 mg of the solid catalyst prepared above in (1). There were obtained 40.3 g of a polymer. The catalyst activity was 1,830 g polymer/g solid catalyst/hour and 6,610 g polymer/g transition metal/hour. The polymer showed MI of 0.058 g/10 minutes, MFR of 69, and a bulk density of 0.23 g/cm$^3$. The catalyst activity was insufficient and the polymer powder was unsatisfactory in bulk density and flowability.

COMPARATIVE EXAMPLE 9

(1) Synthesis of solid catalyst component.

To a solution of 10.0 g (29.3 mmol) of Ti(O-n-$C_4H_9$)$_4$ in 30 ml of n-heptane, was added 18.3 ml [29.3 mmol Zr(O-n-$C_4H_9$)$_4$] of a solution of Zr(O-n-$C_4H_9$)$_4$ in n-heptane. The mixture was stirred for ten minutes at room temperature. To the mixture, while being maintained at 5° C., was added dropwise over a period of 30 minutes 28.8 ml (58.6 mmol n-$C_4H_9$MgCl of a solution of n-$C_4H_9$MgCl prepared in Example 1 (1) in n-butyl ether. With the dropwise addition, the reaction mixture turned brown and a solid product was formed. After completion of the addition, the mixture was allowed to continue the reaction at room temperature for 2 more hours. The liquid phase was removed by filtration and the solid phase was washed 5 times with 200 ml of n-heptane and dried at room temperature under reduced pressure to yield 13.2 g of a brown powder. To a 5.7 g portion of the brown powder, was added 17 ml of n-heptane. To the mixture, was added dropwise over a period of 30 minutes at 60° C. 33 ml (114 mmol $C_2H_5AlCl_2$) of a solution of $C_2H_5AlCl_2$ in n-heptane. After the addition, the mixture was allowed to react at 65° C. for one hour. After completion of the reaction, the liquid phase was removed by filtration and the solid phase was washed 5 times with 50 ml of n-heptane and dried at room temperature under reduced pressure to yield 3.5 g of a brown powder which, on analysis, was found to contain 8.9% by weight of titanium and 16.8% by weight of zirconium.

(2) Polymerization of ethylene.

The polymerization of ethylene was carried out in the same manner as in Example 1 (4), except that 6.7 mg of the brown powder prepared above in (1) was used as the solid catalyst component. There were obtained 50.7 g of a polymer. The catalyst activity was 7,570 g polymer/g solid catalyst/hour and 29,400 g polymer/g transition metal/hour, which indicated an insufficient polymerization activity on the basis of transition metal. The polymer showed MI of 0.15 g/10 minutes, MFR of 80, and a bulk density of 0.24 g/cm$^3$. The polymer powder was unsatisfactory in bulk density and flowability.

COMPARATIVE EXAMPLE 10

(1) Synthesis of solid catalyst component.

A solid catalyst component was prepared by use of the same compounds in the same ratios as in Example 17 (2) and (3), but by a different procedure for the synthesis of intermediate product (II).

To a solution of 11.9 g (70.0 mmol) of SiCl$_4$ in 150 ml of n-heptane, while being maintained at 5° C., was added dropwise over a period of 35 minutes 69.0 ml (140 mmol n-$C_4H_9$MgCl of a di-n-butyl ether solution of n-$C_4H_9$MgCl prepared in Example 17 (1). With the dropwise addition, a white solid product was formed. After the addition, the mixture was allowed to continue the reaction for another hour at 5° C. To the resulting suspension, while being maintained at 5° C., was added dropwise over a period of 30 minutes 50 ml of a n-heptane solution containing each 35.0 mmol of Ti(O-n-$C_4H_9$)$_4$ and Zr(O-n-$C_4H_9$)$_4$. With the dropwise addition, the reaction mixture in suspension form turned brown. After completion of the addition, the mixture was allowed to continue the reaction for 2 more hours at room temperature. The liquid phase was then removed by filtration and the solid phase was washed 5 times with 300 ml of n-heptane and dried at room temperature under reduced pressure to yield 28.2 g of a brown powder which, upon analysis, was found to contain 5.5% by weight of titanium and 10.1% by weight of zirconium. To a 5.0 g portion of the brown powder, was added 18 ml of n-heptane. To the mixture, was added dropwise over a period of 30 minutes at 60° C. 28.9 ml (100 mmol $C_2H_5AlCl_2$) of a solution of $C_2H_5AlCl_2$ in n-heptane. After the addition, the mixture was allowed to react at 65° C. for one hour. After completion of the reaction, the liquid phase was removed by filtration and the solid phase was washed 5 times with 50 ml of n-heptane and dried at room temperature under reduced pressure to yield 2.6 g of a brown powder which, upon analysis, was found to contain 6.4% by weight of titanium and 13.8% by weight of zirconium.

(2) Polymerization of ethylene.

The polymerization of ethylene was carried out in the same manner as in Example 1 (4), except that 9.6 mg of the brown powder prepared above in (1) was used as the solid catalyst component. There were obtained 52.3 g of a polymer. The catalyst activity was 5,470 g polymer/g solid catalyst/hour and 27,000 g polymer/g transition metal/hour. The polymer showed MI of 0.20 g/10 minutes, MFR of 67, and a bulk density of 0.24 g/cm$^3$. The particle size distribution of the polymer powder was broad. The polymer was very unsatisfactory in bulk density and powder flowability.

EXAMPLES 21 to 35

The synthesis of solid catalyst components and the polymerization of ethylene were carried out as in Example 17, using various compounds. The conditions for the synthesis of solid catalyst components and the results of ethylene polymerization were as shown in Table 3 and Table 4, respectively.

TABLE 3

| | Preparation of intermediate product (II) | | | | | | |
|---|---|---|---|---|---|---|---|
| | Component (A) | | Component (B) | | Component (C) | | |
| Example | Compound | Amount used (Si gram-atom) | Compound | Amount used (mol) | Compound (reaction medium) | Amount used (mol) | Reaction medium |
| 21 | SiCl$_4$ | 0.035 | Ti(O—n-Bu)$_4$ | 0.035 | n-BuMgCl ((n-Bu)$_2$O) | 0.105 | n-Heptane |
| | | | Zr(O—n-Bu)$_4$ | 0.035 | | | |
| 22 | " | 0.070 | Ti(O—n-Bu)$_4$ | 0.012 | n-BuMgCl ((n-Bu)$_2$O) | 0.140 | " |
| | | | Zr(O—n-Bu)$_4$ | 0.058 | | | |
| 23 | " | 0.035 | TiCl$_4$ | 0.035 | n-BuMgCl ((n-Bu)$_2$O) | 0.105 | " |
| | | | Zr(O—n-Bu)$_4$ | 0.035 | | | |
| 24 | " | " | TiCl$_4$ | 0.035 | n-BuMgCl ((n-Bu)$_2$O) | " | " |
| | | | Zr(O—n-Bu)$_4$ | 0.035 | | | |
| 25 | " | " | TiCl$_4$ | 0.035 | n-BuMgCl ((n-Bu)$_2$O) | " | " |
| | | | Zr(O—n-Bu)$_4$ | 0.035 | | | |
| 26 | " | 0.120 | Ti(O—n-Bu)$_4$ | 0.006 | n-BuMgCl ((n-Bu)$_2$O) | 0.126 | " |
| 27 | " | 0.080 | Zr(O—n-Bu)$_4$ | 0.016 | n-BuMgCl ((n-Bu)$_2$O) | 0.096 | " |
| 28 | " | 0.070 | n-BuO—(Ti—O)$_4$n-Bu with O—n-Bu substituents | 0.0035 | n-BuMgCl | 0.098 | " |
| | | | Zr(O—n-Bu)$_4$ | 0.014 | (Tetrahydrofuran) | | |
| 29 | [(CH$_3$)$_3$Si]$_2$O | 0.080 | Ti(OEt)$_4$ | 0.027 | n-BuMgCl (Tetrahydrofuran) | 0.160 | Toluene |
| | | | Zr(O—n-Pr)$_4$ | 0.053 | | | |
| 30 | " | 0.054 | Ti(OEt)$_4$ | 0.009 | n-BuMgCl (Tetrahydrofuran) | 0.108 | " |
| | | | Zr(O—n-Pr)$_4$ | 0.045 | | | |
| 31 | Dimethylpolysiloxane (100 cSt, 25° C.) | 0.054 | Ti(O—n-Bu)$_4$ | 0.009 | n-BuMgCl ((i-Pr)$_2$O) | 0.108 | n-Heptane |
| | | | Zr(O—n-Bu)$_4$ | 0.045 | | | |
| 32 | SiCl$_4$ | 0.070 | Ti(O—n-Bu)$_4$ | 0.012 | (n-Bu)Mg(sec-Bu) (n-Heptane) | 0.140 | " |
| | | | Zr(O—n-Bu)$_4$ | 0.058 | | | |
| 33 | (C$_6$H$_5$)$_2$Si(OH)$_2$ | 0.080 | Ti(O—n-Bu)$_4$ | 0.027 | n-BuMgCl ((n-Bu)$_2$O) | 0.160 | (n-Bu)$_2$O |
| | | | Zr(O—n-Bu)$_4$ | 0.053 | | | |
| 34 | CH$_3$(OC$_2$H$_5$)$_3$ | 0.054 | Ti(O—n-Bu)$_4$ | 0.009 | n-BuMgCl ((n-Bu)$_2$O) | 0.108 | " |
| | | | Zr(O—n-Bu)$_4$ | 0.045 | | | |
| 35 | Dimethylpolysiloxane (100 cSt, 25° C.) | " | TiCl$_4$ | 0.027 | n-BuMgCl ((n-Bu)$_2$O) | " | n-Heptane |
| | | | VOCl$_3$ | 0.027 | | | |

| | | Preparation of hydrocarbon-insoluble product (III) | | |
|---|---|---|---|---|
| | Component (D) | | | Transition metal content of product (III) (% by weight) |
| Example | Compound | Amount used (mmol/g product (II)) | Reaction medium | |
| 21 | EtAlCl$_2$ | 25 | n-Heptane | Ti 7.1 |

TABLE 3-continued

| | | | | | |
|---|---|---|---|---|---|
| | | | | Zr | 14.0 |
| 22 | " | 15 | " | Ti | 2.1 |
| | | | | Zr | 17.5 |
| 23 | " | 18 | " | Ti | 6.9 |
| | | | | Zr | 14.1 |
| 24 | " | 14 | " | Ti | 6.7 |
| | | | | Zr | 12.8 |
| 25 | " | 10 | " | Ti | 6.3 |
| | | | | Zr | 11.9 |
| 26 | EtAlCl$_2$ | 15 | " | Ti | 2.1 |
| 27 | " | " | " | Zr | 8.9 |
| 28 | Et$_2$AlCl | 25 | " | Ti | 4.4 |
| | | | | Zr | 10.1 |
| 29 | " | 40 | " | Ti | 4.1 |
| | | | | Zr | 14.9 |
| 30 | " | " | " | Ti | 1.9 |
| | | | | Zr | 17.2 |
| 31 | EtAlCl$_2$ | 20 | " | Ti | 2.2 |
| | | | | Zr | 15.1 |
| 32 | " | 17 | " | Ti | 2.4 |
| | | | | Zr | 17.9 |
| 33 | " | 20 | " | Ti | 4.0 |
| | | | | Zr | 14.2 |
| 34 | " | " | " | Ti | 1.7 |
| | | | | Zr | 16.4 |
| 35 | i-BuAlCl$_2$ | 15 | " | Ti | 6.1 |
| | | | | V | 6.2 |

Note:
Et = C$_2$H$_5$, n-Pr = n-C$_3$H$_7$, i-Pr = iso-C$_3$H$_7$, n-Bu = n-C$_4$H$_9$, i-Bu = iso-C$_4$H$_9$, sec-Bu = sec-C$_4$H$_9$

TABLE 4

| Example No. | Amount of solid catalyst component (mg) | Organo-metallic compound | Polymeri-zation temp. (°C.) | Yield of polymer (g) | Catalyst activity g Polymer/g solid catalyst/hour | g/Polymer/g trasition metal/hour | Bulk density (g/cm$^3$) | MI (g/10 min) | MFR |
|---|---|---|---|---|---|---|---|---|---|
| 21 | 5.9 | Triisobutyl-aluminum | 80 | 61.7 | 10,500 | 49,600 | 0.38 | 0.23 | 82 |
| 22 | 8.3 | Triisobutyl-aluminum | " | 52.4 | 6,310 | 32,200 | 0.40 | 0.29 | 79 |
| 23 | 8.3 | Triisobutyl-aluminum | " | 59.8 | 7,200 | 34,300 | 0.38 | 0.22 | 80 |
| 24 | 6.0 | Triisobutyl-aluminum | " | 55.1 | 9,180 | 47,100 | 0.40 | 0.34 | 72 |
| 25 | 4.3 | Triisobutyl-aluminum | " | 57.6 | 13,400 | 73,600 | 0.39 | 0.51 | 58 |
| 26 | 3.2 | Triisobutyl-aluminum | " | 54.7 | 17,100 | 814,000 | 0.37 | 1.02 | 34 |
| 27 | 19.4 | Triisobutyl-aluminum | " | 48.0 | 2,470 | 27,800 | 0.39 | 0.20 | 150 |
| 28 | 6.4 | Triisobutyl-aluminum | " | 49.0 | 7,660 | 52,800 | 0.38 | 0.36 | 71 |
| 29 | 11.9 | Triisobutyl-aluminum | " | 47.8 | 4,020 | 21,100 | 0.36 | 0.20 | 83 |
| 30 | 8.5 | Triisobutyl-aluminum | " | 52.4 | 6,160 | 32,300 | 0.38 | 0.10 | 85 |
| 31 | 9.7 | Triisobutyl-aluminum | " | 48.2 | 4,970 | 28,700 | 0.38 | 0.11 | 76 |
| 32 | 8.9 | Triisobutyl-aluminum | " | 51.1 | 5,740 | 28,300 | 0.34 | 0.25 | 75 |
| 33 | 10.1 | Triisobutyl-aluminum | " | 53.8 | 5,330 | 29,300 | 0.36 | 0.36 | 70 |
| 34 | 7.8 | Triisobutyl-aluminum | " | 57.9 | 7,420 | 41,00 | 0.39 | 0.24 | 88 |
| 35 | 3.1 | Triisobutyl-aluminum | " | 60.7 | 19,600 | 159,00 | 0.35 | 1.27 | 40 |

What is claimed is:

1. A solid catalyst component for olefin polymerization comprising a hydrocarbon-insoluble product (III) obtained by reacting (A) a silicon compound selected from the group consisting of (1) halogen-containing silicon compounds, (2) silicon compounds having a monomeric unit

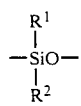

(wherein R$^1$ and R$^2$ may be the same or different, R$^1$ represents an alkyl, aryl, cycloalkyl, alkoxy, or aryloxy group, or a hydrogen atom, and R$^2$ represents an alkyl, aryl, or cycloalkyl group or a hydrogen atom) and a polymerization degree of 2 to 10,000, (3) silanols of the general formula $R^3{}_lSi(OH)_{4-l}$ (wherein $R^3$ represents an alkyl, aryl, or cycloalkyl group or a hydrogen atom, and l is 1, 2 or 3) or condensation products thereof, (4) silicon compounds represented by the general formula $R^4{}_mSi(OR^5)_{4-m}$ (wherein $R^4$ represents an alkyl, aryl, cycloalkyl, or alkenyl group or a hydrogen atom, $R^5$ represents an alkyl or aryl group or a fatty acid moiety, and m is 1, 2 or 3), and (5) silicon compounds or polymers thereof represented by the general formula $[SiO_a(OR^6)\,b]n$ (wherein $R^6$ represents an alkyl, cycloalkyl, aralkyl or aryl group or a fatty acid moiety, and a and b are each a number defined by the formula $0 \leq a \leq 1$ $2 \leq b \leq 4$, and n is an integer of from 1 to 10,000), with (B) a compound of a transition metal of Groups IVa, Va and VIa of the periodic table to form a reaction mixture (I), further reacting the reaction mixture (I) with (C) an organomagnesium compound selected from organomagnesium compounds or hydrocarbon-soluble complexes thereof with an organometallic compound capable of solubilizing said organomagnesium compounds, to produce an intermediate product (II) and contacting the intermediate product (II) with (D) an organoaluminum halide represented by the general formula $R^7{}_cAlX_{3-c}$ (wherein $R^7$ represents an organic group having 1 to 20 carbon atoms, X represents a halogen, and c is a number defined by the formula $0 < c < 3$) to form the hydrocarbon-insoluble product (III).

2. A solid catalyst component for olefin polymerization according to claim 1, wherein the component (A) is a tetraalkoxysilane or a tetraaryloxysilane.

3. A solid catalyst component for olefin polymerization according to claim 1, wherein the component (A) is silicon tetrachloride.

4. A solid catalyst component for olefin polymerization according to claim 1, wherein the component (A) is a polysiloxane.

5. A solid catalyst component for olefin polymerization according to claim 1, wherein the component (B) is a compound represented by the general formula $[M^1O_p(OR^8)_qX_r]d$ wherein $M^1$ is a transition metal of Groups IVa, Va and VIa of the periodic table, $R^8$ is an organic group having 1 to 20 carbon atoms, X is a halogen atom, p is a number defined by the formula $0 \leq p \leq 1.5$, q and r are numbers defined by the formulas $0 \leq q \leq 4$ and $0 \leq r \leq 4$, and d is an integer.

6. A solid catalyst component for olefin polymerization according to claim 5, wherein $M^1$ is an element selected from titanium, vanadium, zirconium and hafnium.

7. A solid catalyst component for olefin polymerization according to claim 5, wherein $M^1$ is an element selected from titanium and zirconium.

8. A solid catalyst component for olefin polymerization according to claim 5, wherein a combination of two or more compounds containing different transition metals ($M^1$) is used as the component (B).

9. A solid catalyst component for olefin polymerization according to claim 8, wherein a combination of titanium and zirconium or of titanium and vanadium is used as the transition metal ($M^1$).

10. A solid catalyst component for olefin polymerization according to claim 9, wherein the atomic ratio of titanium to zirconium is from 1:50 to 50:1.

11. A solid catalyst component for olefin polymerization according to claim 9, wherein the atomic ratio of titanium to zirconium is from 1:20 to 20:1.

12. A solid catalyst component for olefin polymerization according to claim 9, wherein the atomic ratio of titanium to zirconium is from 1:10 to 10:1.

13. A solid catalyst component for olefin polymerization according to claim 1, wherein the component (C) is a compound represented by the general formula $R^9MgX$ wherein $R^9$ is a hydrocarbon radical having 1 to 20 carbon atoms and X is a halogen atom, or $R^{10}R^{11}Mg$ wherein $R^{10}$ and $R^{11}$ are each a hydrocarbon radical having 1 to 20 carbon atoms.

14. A solid catalyst component for olefin polymerization according to claim 13, wherein the component (C) is used in the form of a solution in an ether or a complex with an ether.

15. A solid catalyst component for olefin polymerization according to claim 14, wherein the ether has 6 or more carbon atoms or a cyclic structure.

16. A solid catalyst component according to claim 1, wherein the component (D) is an alkylaluminum dichloride represented by the general formula $R^7AlCl_2$ wherein $R^7$ is an alkyl group having 1 to 20 carbon atoms.

17. A solid catalyst component for olefin polymerization according to claim 1, wherein the component (D) is ethylaluminum dichloride.

18. A solid catalyst component for olefin polymerization according to claim 1, wherein the component (D) is isobutylaluminum dichloride.

19. A solid catalyst component for olefin polymerization according to claim 1, wherein the intermediate product (II) is isolated from the reaction mixture.

20. A solid catalyst component for olefin polymerization according to claim 1, wherein the atomic ratio of the component (A) in terms of silicon atom to the component (B) in terms of transition metal atom is in the range of from 1:50 to 50:1.

21. A solid catalyst component for olefin polymerization according to claim 1, wherein the atomic ratio of the component (A) in terms of silicon atom to the component (B) in terms of transition metal atom is in the range of from 1:20 to 20:1.

22. A solid catalyst component for olefin polymerization according to claim 1, wherein the atomic ratio of the component (A) in terms of silicon atom to the component (B) in terms of transition metal atom is in the range of from 1:2 to 2:1.

23. A solid catalyst component for olefin polymerization according to claim 1, wherein the amount of the component (D) in terms of halogen atom for 1 g of the intermediate product (II) is 0.01 to 0.1 gram equivalent.

24. A process for the preparation of a solid catalyst component for olefin polymerization, which comprises reacting (A) a silicon compound selected from the group consisting of (1) halogen-containing silicon compounds, (2) silicon compounds having a monomeric unit

(wherein $R^1$ and $R^2$ may be the same or different, $R^1$ represents an alkyl, aryl, cycloalkyl, alkoxy, or aryloxy group, or a hydrogen atom, and $R^2$ represents an alkyl, aryl, or cycloalkyl group or a hydrogen atom) and a polymerization degree of 2 to 10,000, (3) silanols of the general formula $R^3{}_l Si(OH)_{4-l}$ (wherein $R^3$ represents an alkyl, aryl, or cycloalkyl group or a hydrogen atom, and $l$ is 1, 2 or 3) or condensation products thereof, (4) silicon compounds represented by the general formula $R^4{}_m Si(OR^5)_{4-m}$ (wherein $R^4$ represents an alkyl, aryl, cycloalkyl, or alkenyl group or a hydrogen atom, $R^5$ represents an alkyl or aryl group or a fatty acid moiety, and $m$ is 1, 2 or 3, and (5) silicon compounds or polymers thereof represented by the general formula $[SiO_a(OR^6)_b]_n$ (wherein $R^6$ presents an alkyl, cycloalkyl, aralkyl, or aryl group or a fatty acid moiety, a and b are each a number defined by the formula $0 \leq a \leq 1$ or $2 \leq b \leq 4$, and n is an integer of from 1 to 10,000) with (B) a compound of a transition metal of Groups IVa, Va and VIa of the periodic table to form a reaction mixture (I); then reacting the reaction mixture (I) with (C) an organomagnesium compound selected from organomagnesium compounds or hydrocarbon-soluble complexes thereof with an organometallic compound capable of solubilizing said organomagnesium compounds, to form an intermediate product (II); and containing the intermediate product (II) with (D) an organoaluminum halide represented by the general formula $R^7{}_c AlX_{3-c}$ (wherein $R^7$ represents an organic group having 1 to 20 carbon atoms, X represents a halogen atom, and c is a number defined by the formula $0 < c < 3$) to form a hydrocarbon-insoluble product (III) suitable for use as the solid catalyst component.

* * * * *